United States Patent [19]

Allsup, Jr.

[11] 3,858,523
[45] Jan. 7, 1975

[54] VEHICLE STEERING MECHANISM

[75] Inventor: Harvey C. Allsup, Jr., Fort Worth, Tex.

[73] Assignee: LTV Aerospace Corporation, Dallas, Tex.

[22] Filed: Mar. 30, 1973

[21] Appl. No.: 346,562

[52] U.S. Cl. .................................. 104/247, 180/79
[51] Int. Cl. ............................................. B61f 9/00
[58] Field of Search ...................... 180/79; 280/87.2; 104/244.1, 243, 247; 46/244 R, 216

[56] References Cited
UNITED STATES PATENTS
3,338,182  8/1967  Maestrelli ........................... 104/247
3,724,584  4/1973  Varichon .............................. 180/79

FOREIGN PATENTS OR APPLICATIONS
743,825  1/1933  France ................................ 104/247

Primary Examiner—David Schonberg
Assistant Examiner—John A. Pekar
Attorney, Agent, or Firm—Walter J. Jagmin; James M. Cate

[57] ABSTRACT

A vehicle steering mechanism which includes separate transversely movable steering members linked to each pair of wheels of the vehicle for individually turning the pairs of wheels about substantially vertical axes in accordance with the transverse movements of the steering members relative to the vehicle. A motion translating device usable in a linkage of a steering mechanism connecting a steering member to its associated pair of wheels which is selectively adjustable to cause the pair of wheels to turn in either selected one of two opposite directions upon transverse movement of the steering member in a given direction relative to the vehicle to provide for proper steering of the vehicle regardless of which end of the vehicle is the front end in the direction of movement of the vehicle.

5 Claims, 8 Drawing Figures

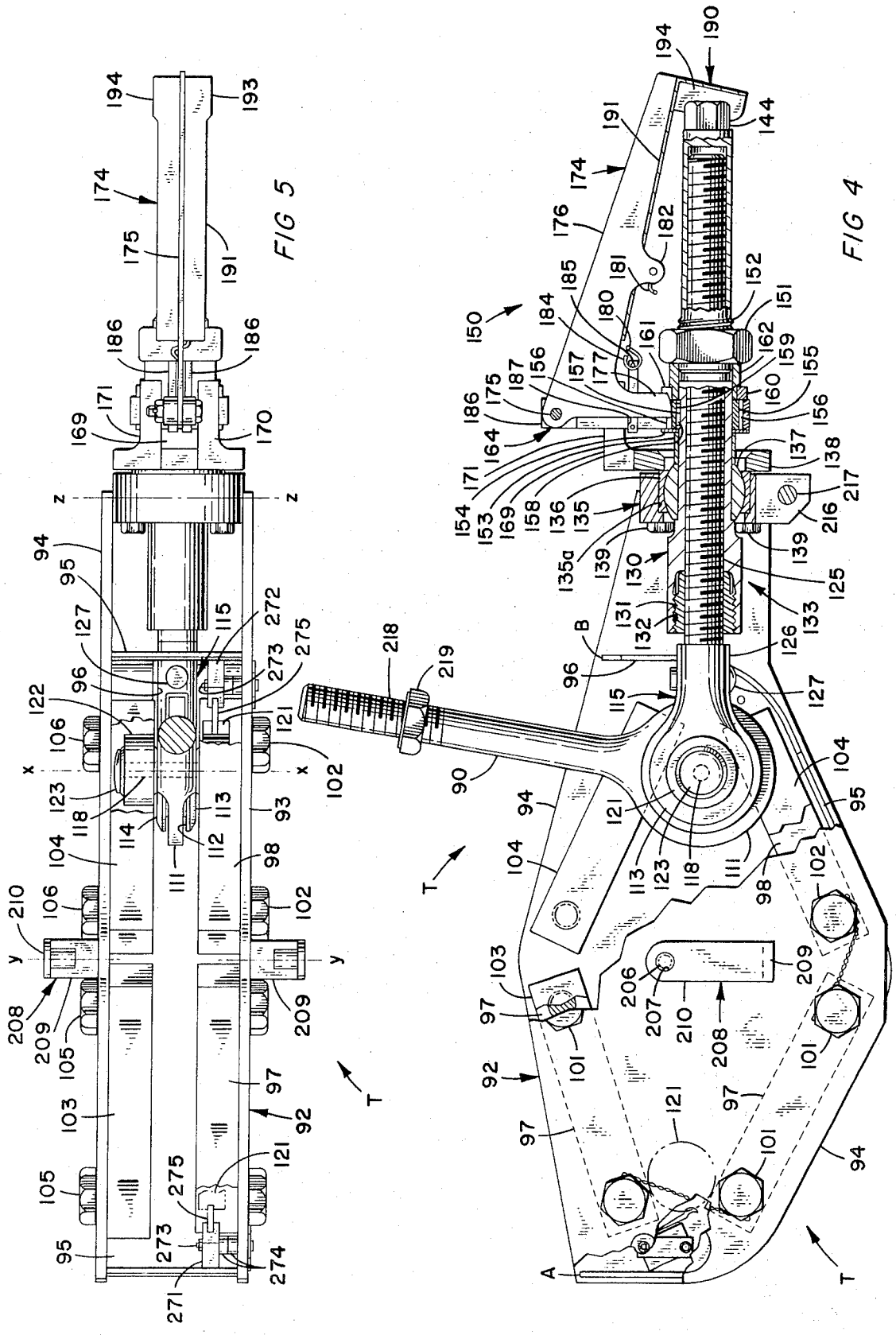

VEHICLE STEERING MECHANISM

This invention relates to vehicles steering mechanisms and to motion translating devices.

Vehicles which are provided with pairs of wheels at their opposite ends, with each pair being controlled by a separate steering mechanism having a transversely movable steering member, must have motion translating means for causing the pair of wheels to turn in one direction when the steering member is moved transversely in a given direction when the pair of wheels is at the front end of the vehicle in the direction of movement of the vehicle and to turn the wheels in the opposite direction upon the movement of the steering member in such given direction relative to the vehicle when the direction of movement of the vehicle is reversed so that the pair of wheels which were formerly at the front end of the vehicle become the rear wheels and vice versa.

Accordingly, it is an object of this invention to provide a new and improved vehicle steering mechanism having a motion translating device connected between a transversely movable main steering member of the mechanism and the pair of wheels it controls for causing the vehicle to turn in a selected one of two opposite directions on movement of the steering member in a given direction.

Another object is to provide a vehicle steering mechanism wherein the motion translating device is provided in the steering mechanism linkage connecting the steering member to the wheels.

Still another object is to provide a vehicle steering mechanism, of the type described, wherein the motion translating device has a body connected to the vehicle axle for pivotal movement about a first axis and input and output members pivotally connected to the body, with one of the members being pivotal relative to the body about a second axis positionable in a first position located between the first axis and the third axis of pivotal movement of the other member relative to the body so that the output member is moved in the same direction as the input member when a force applied to the input member causes the body to pivot about the first axis, and a second position wherein the first axis is disposed between the second and third axes so that the output member is moved in a direction opposite to the direction of movement of the input member when a force applied to the input member causes the body to pivot about the first axis.

An important object of the invention is to provide a motion translating device for selectively changing the direction of movement of an output member relative to the direction of movement of an input member.

Another object is to provide a motion translating device having a body pivotally connectable to a base structure for movement about a first axis, an input member pivotally connected to the body for pivotal movement relative thereto about a second axis spaced from the first axis, and an output member pivotally connected to the body for movement about a third axis selectively positionable in a first position wherein the third axis is located between the first and second axes, so that when the body is pivoted about the first axis by a force applied to the input member the output member is moved in the same direction as the input member, and a second position wherein the first axis is disposed between the second and third axes whereby when the body is pivoted about the first axis by a force applied to the input member, the output member is moved in a direction opposite to the direction of movement of the input member.

Still another object is to provide a motion translating device, of the type described, having an adjusting mechanism connecting the output member to the body for moving the axis of pivotal connection of the output member relative to the body selectively between the first and second positions.

A further object of the invention is to provide a motion translating device, of the type described, wherein the motion translating device has a lock means for locking the adjusting mechanism when the axis of pivotal connection of the output member is in either of the first and second positions.

A still further object is to provide a motion translating device having indicator means for indicating if the axis of pivotal connection of the output member is in either of its two selected operative positions.

Other objects and advantages will be apparent from the specification and claims and from the accompanying drawing illustrative of the invention.

In the drawing:

FIG. 4 is a plan view, with some parts broken away and some shown in section 1, of a motion translating device embodying the invention;

FIG. 5 is a side view of the device illustrated in FIG. 4; and,

FIGS. 5, 6, 7 and 8 are plan views of selected elements of the motion translating device.

Figure 1:
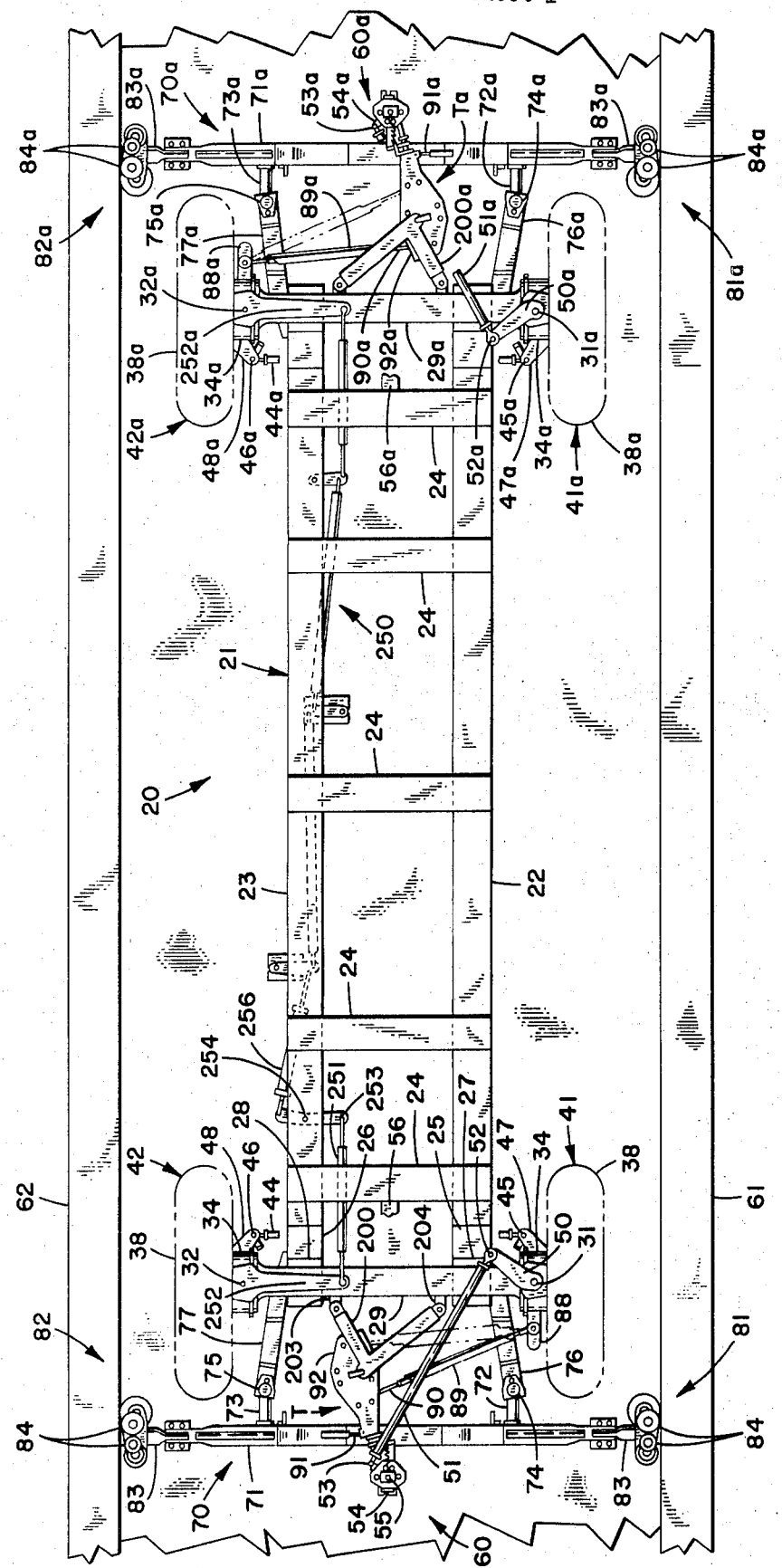
FIG. 1 is a top view, with some parts broken away, of the frame of a vehicle whose wheel steering mechanisms are provided with motion translating devices embodying the invention.
Figure 2:
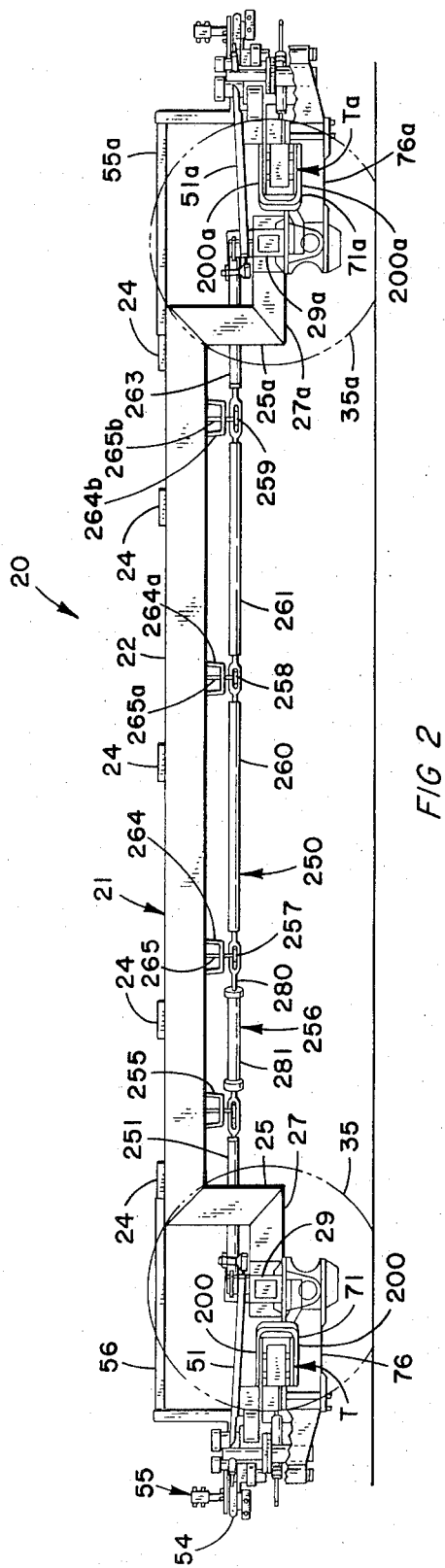
FIG. 2 is a side view, with some parts broken away, of the vehicle illustrated in FIG. 1.
Figure 3:
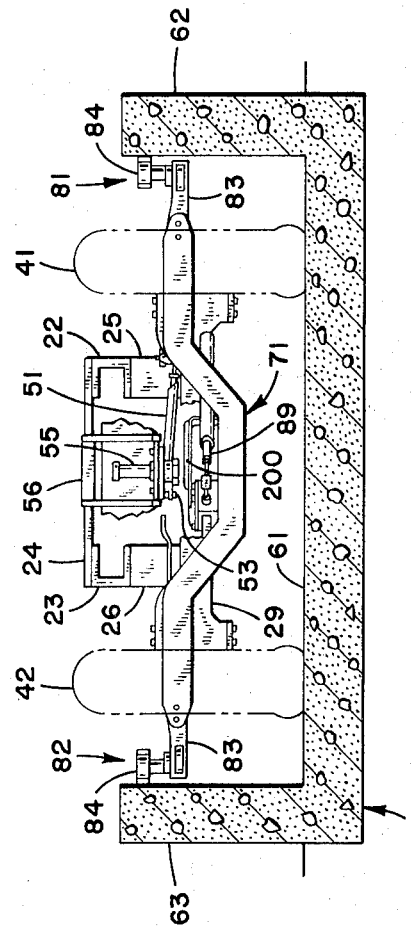
FIG. 3 is an end view, with some parts broken away, of the vehicle illustrated in FIG. 2.

Referring now to the drawings, the vehicle 20, which is provided with a motion translating devices embodying the invention, includes a main frame 21 comprising a pair of parallel longitudinal side members 22 and 23 which are connected by a plurality of transverse members 24. The side members 22 and 23 at one end have dependent legs 25 and 26 provided at their lower ends with extensions 27 and 28 which are rigidly secured, in any suitable manner, to an axle 29. The axle at its opposite ends is provided with substantially vertical king pins 31 and 32 on whose horizontal spindles are rotatably mounted the usual hubs 34 to which the wheel 35 may be secured. The wheels are of course provided with resilient tires 38. The wheels 41 and 42, each formed of a wheel disk and a tire, are caused to turn simultaneously about the vertical axes of their king pins 31 and 32, respectively, by a tie rod 44 whose opposite ends are pivotally connected, as at 45 and 46, to the arms 47 and 48 rigidly connected in the usual manner to the king pins 31 and 32, respectively, so as to comprise the well known "Ackerman Steering Linkage" which minimizes tire wear.

The king pin 31 has an arm 50 rigidly secured to its top end. One end of a link 51 is pivotally connected, as at 52, to the king pin arm 50 and its other end is pivotally connected, as at 53, to a lever arm 54 rotatably mounted, by suitable bearing means, on a vertical shaft 55 rigidly mounted on the forward end of a draw bar 56 which extends from an adjacent transverse member 24 of the frame 21. The towing bar of a towing vehicle is rigidly securable to the lever arm 54 which is rotatable on the shaft 55 with the towing vehicle; therefore, the lever arm 54 will rotate with the towing vehicle tow bar as the towing vehicle turns relative to the vehicle 20 and will cause the linkage comprising the lever arm 54, the link 51 and the arm 50 to cause the king pin 31 to rotate in the direction of turning movement of the towing vehicle. Since the king pins 31 and 32 are connected by the rod 44, the two wheels of the vehicle will then be turned about the axes of their king pins in the same direction as the turning movement of the towing vehicle.

The vehicle is specially adapted to be moved in a predetermined path over a roadway 60 which has a planar road surface 61 and side walls 62 and 63. The vehicle may be driven in any suitable manner over the roadway. For example, one or more of the wheels 41, 42, 41a and 42a may be driven by an electric motor or the vehicle may have mounted thereon the primaries of two linear induction motors along its sides in which case the secondaries of the motors would be mounted along the sides of the roadway 61.

During movement of the vehicle over the roadway, the wheels 41 and 42 are steered by a steering mechanism 70 which includes a transverse follower bar 71 which has two arms 72 and 73 pivotally connected, as by shafts 74 and 75, to the other ends of brackets 76 and 77 whose inner ends are rigidly secured by any suitable means to the axle 29.

At its opposite ends, the follower bar is provided with wheel assemblies 81 and 82 each of which comprises a bracket 83 bolted to the end of the follower bar and a plurality of wheels 84 mounted on the bar for rotation about vertical axes. The wheels of the assembly 81 are engageable with the roadway wall 62 while the wheels of the assembly 82 are engageable with the roadway wall 63.

It will be apparent that the follower bar will move transversely relative to the frame of the vehicle in one direction or the other as either one set or the other of the guide wheels engages its associated roadway wall if the vehicle tends to move laterally toward such wall or if such wall curves, as at locations of changes of direction of the roadway.

The follower bar 71 of the steering mechanism 70 is connected to a steering arm 88 of the king pin 31 by a motion translating device T and a link 89.

Figure 6:
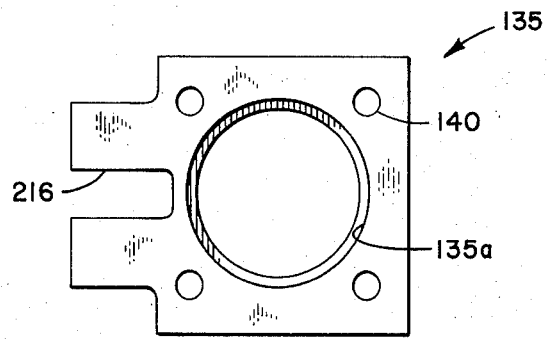

The motion translating device T, FIGS. 5 and 6, for selectively causing its output member 90 to move either in the same direction or in a direction opposite to that of its input member 91, includes a body 92 formed of two parallel plates 93 and 94 which are connected and held in spaced relation by a wall strip 95, welded thereto, which extends from the location A, to the location B and at its lower portion is provided with a notch 96.

Two pairs of cam bars 97 and 98 are secured to the inner side of the body plate 93 by bolts 101 and 102, respectively, which extend through suitable apertures in the plate 93 into suitable threaded bores of the cam bars.

The pairs of cam bars 97 and 98 extend convergently outwardly from the middle of the body in opposite directions.

The bottom plate 94 similarly has two pairs of cam bars 103 and 104 secured thereto by bolts 105 and 106, respectively. The cam bars 103 are in alignment with the cam bars 97 while the cam bars 104 are in alignment with the cam bars 98.

The output member or rod 90 of the motion translating device extends laterally outwardly of the body through the space between the pairs of cam bars 97 and 103 and the bars 98 and 104 at the right side of the body, FIG. 4. The inner end portion 111 of the output rod is flattened and extends into the slot 112 defined by the inner spaced end portions 113 and 114 of a clevis 115. The portion 111 is pivotally connected to the clevis by a shaft 118 which extends through aligned apertures in the clevis portions 113 and 114 and the portion 111. The shaft has opposite end portions extending outwardly of the clevis on which are rotatably mounted cam bar engaging rollers 121 and 122 which are secured rotatably on the shaft 118 by suitable retainers 123.

The roller 121 is engageable with the inner surface of the pairs of cam bars 97 and 98 while the roller 122 is engageable with the inner surfaces of the pairs of cam bars 103 and 104.

A screw 125 has one end portion telescoped in the socket 126 of the clevis and held rigidly therein by a bolt 127 which extends through aligned apertures in the screw and the clevis socket.

The screw extends into a tubular member 130 which has a nut or threaded member 131, rigidly secured in the enlarged end portion 132 thereof, which is in threaded engagement with the screw.

The tubular member is secured to the body 92 by a mounting assembly 133 which permits rotational movement of the tubular body, while preventing its longitudinal movement, relative to the body 92.

Figure 8:
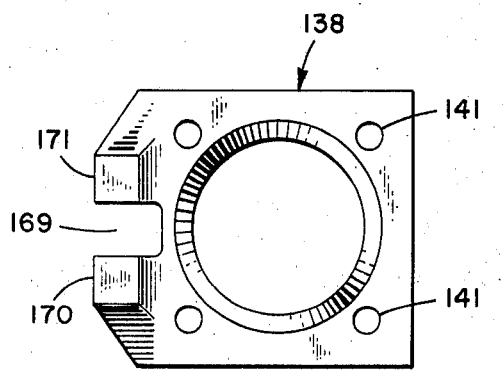

The mounting assembly 133 includes a bearing block 135, FIGS. 4 and 6 which is positioned between the plates 93 and 94 and rigidly secured thereto in any suitable manner, as by welding. The bearing block has a downwardly opening recess 135a in which is disposed a bearing 136 which has an arcuate or spherical seat for engaging a ball section member 137 disposed about the tubular member 130. The mounting assembly also includes a retainer 138, FIGS. 4 and 8, rigidly secured to the bearing block by bolts 139 which extend through suitable apertures 140 in the bearing block into threaded bores 141 of the retainer.

The tubular member 130 is provided on its other head with a hexagonal nut 144 so that the tubular member may be rotated by a suitable tool, such as a wrench, not shown.

A locking assembly 150 is mounted on the tubular member 130, between the ball section member 137 and a nut 151 threaded on the threaded enlarged section 152 of the tubular member, and includes a spacer sleeve 153, a retainer ring 154, a lock ring 155, having external longitudinal slots 156, held against rotation by a tongue 157 disposed in aligned external and internal longitudinal recesses or slots 158 and 159 of the tubular member and the lock ring, respectively, a split retainer ring 160 which has a slot 161, and a retainer ring 162.

Figure 7:
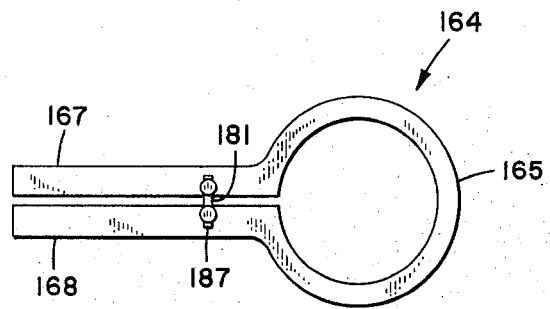

A bracket 164 (FIGS. 4, 5 and 7) has a circular portion 165 which extends about the lock ring between the retainer rings 154 and 160 and spaced parallel arms 167 and 168. The arms 167 and 168 extend outwardly through the slot 169 provided by the legs 170 and 171 of the retainer member 138 and the bracket 164 is therefore held against rotation about the tubular member due to the engagement of its arms with the retainer member legs.

A latch member 174 is pivotally mounted to and between the arms 167 and 168 by a bolt 175 which extends through aligned apertures in the outer ends of the arms and the upper outer end of a planar member 176 of the latch member. The planar member has a tooth portion 177 extending angularly from its end which is adapted to move through the slot 161 of the retainer ring 160 and a selected slot 156 of the lock ring as the latch member is pivoted about the axis of the bolt 175. The latch member is biased in a clockwise direction, FIG. 4, toward locking position, wherein its tooth 177 is in a slot 156 of the lock ring thus preventing rotation of the tubular member, by a spring 180 whose hooked end 181 extends through an aperture in a lug 182 of the planar member 176. The other hooked end 184 of the spring is hooked over a pin 185 secured to a pair of bars 186 which extend through facing slots 187 of the arms and are secured thereto in any suitable manner, as by welding.

The latch member 174 may include a cover 190 having a planar section 191 secured to the planar member 176 by welding, an end section 192 and side flanges 193 and 194. It will be apparent that when the latch member is in its locking position, the hexagonal nut 144 is disposed between the side flanges 193 and 194.

The body 92 of the motion translating device T is pivotally secured to the axle 29 by a pair of vertically spaced and aligned angle brackets 200 whose legs 201 and 202 are secured rigidly to brackets 203 and 204 which extend from the axle. The body 92 is disposed between the pair of brackets 200 and is secured thereto by shafts 206 (FIG. 4) which extend through bores 207 of a pair of mounting lugs 208 into suitable apertures of the brackets. The mounting lugs have legs 209 which are welded to the plates 93 and 94 and strap portions 210 which overlap the brackets 200. The axis of the shafts 106 is the axis y of pivotal movement of the body 92.

The input member 91 of the motion translating device is rigid with the follower bar and extends into the slot 216 of the bearing block and is pivotally secured thereto by a shaft 217 which extends through suitable aligned apertures in the input member 91 and the bearing block.

The output member 90 is rigidly connected to the link 89, its outer end portion 218 being threaded in a suitable threaded bore of the link 89. A lock nut 219 is on the threaded portion to lock the link in selected position.

It will now be apparent that the motion translating device include the body 92 which is mounted for pivotal movement about a first axis y, the axis of the shafts 106, and that the output and input members 90 and 91 are pivotally connected to the body for pivotal movement about the axes x and z, respectively. It will also be apparent that when the axis y is located between the axes x and z, the output member will be moved in a direction opposite to the direction of movement of the input member 91 and that when the axis x is moved to a position between the axes y and z, the output member 90 will move in the same direction as the input member 91 as the body is pivoted about the axis y due to a force supplied thereto by the input member 91.

It will now be apparent that if the vehicle is moving to the left as seen in FIG. 1, the wheels 41 and 42 are at the front end of the vehicle in the direction of movement thereof and must turn in a clockwise direction about the axes of their king pins 31 and 32 if the vehicle must be turned to the left, as when the vehicle tends to move toward the side wall 62 and the vehicle frame is moved laterally toward the side wall and relative to the follower bar due to the engagement of the wheel assembly 82 and the side wall 62 or the roadway curves to the left and the follower bar is moved transversely to the left relative to the vehicle frame. In this case the motion translating device T is placed in the position illustrated in FIGS. 4 and 5 of the drawing wherein the cam rollers 21 and 22 are in engagement with the cam bars 98 and 104, respectively and in full lines in FIG. 1.

The link 89 and the output rod 90 are now in the full line positions illustrated in FIG. 1 so that the axis of pivotal connection of the output rod with the clevis is located between the location of pivotal connections of the body 92 with the follower bar and the brackets 200. As a result, the output rod, and therefore the link, will move laterally in the same direction as the follower bar and the rod or input member 91 when the follower bar is moved laterally.

If the vehicle is moving to the right so that the wheels 41 and 42 are now at the rear of the vehicle, if the vehicle now tends to move laterally on the roadway or must change directions of movement at curved portions of the roadway, it is necessary that the direction of lateral movement of the output member and link 89 be opposite to that of the follower bar and the input member 91. The tubular member 130 is therefore rotated until the clevis is at its other extreme position, illustrated in broken lines in FIG. 4, with the cam rollers 21 and 22 in engagement with the cam bars 97 and 103. The output rod 90 and the link 89 are now in the position illustrated in broken line in FIG. 1 with the axis y of pivotal connection of the body 92 to the axle being disposed between the axis x of pivotal connection of the clevis and output rod with the body 92 and the axis z of pivotal connection of the body 92 with the input member 91. As a result, if the vehicle is now moving to the right, FIG. 1, and the vehicle tends to move laterally toward the side wall 62, the vehicle frame due to the engagement of the wheel assembly 82 with the side wall 62, will move toward the side wall and relative to the follower bar, and the wheels will be pivoted in clockwise manner about the vertical axes of their king pins.

The wheel 41a and 42a at the other end of the vehicle frame are connected to one another, to the frame and the steering mechanism in the same manner as are connected the wheels 41 and 42 and, accordingly the various elements of the means associated with the wheels 41a and 42a have been provided with the same reference characters, to which the subscript "a" has been added, as the various elements of the means associated with the wheels 41 and 42.

It is desirable, when the vehicle is being towed, that the pair of wheels turn, but in the opposite direction, when the front wheels turn to facilitate turning movement of the vehicle and minimize tire wear. A linkage 250 which connects the king pins of the wheels 42 and 42a is provided for this purpose.

The linkage 250 includes a link 251 pivotally connected at one end to the arm 252 of the king pin 32 and at its other end to one end of a reversing lever 253 which is pivotally connected as at 254 to the frame by means of a bracket 255 secured to the side frame. The other end of the reversing lever is pivotally connected to one end of an overload device 256. It will be apparent that since the axis of pivotal movement of the reversing lever is between the axes of pivotal connections of the lever with the link 251 and the overload device, the overload device will be moved to th left when the link 251 is moved to the right and vice versa. The other end of the overload device is connected to the arm 252a of the king pin 32a by support levers 257, 258, and 259 and the links 260, 261 and 263 which extend between and are pivotally connected to the support levers. The support levers are pivotally secured to the frame by suitable brackets 264 and shaft 265.

The overload device, which is not per se a part of the claimed invention, permits movement of the link 251 relative to the link 260 in the event that the force tending to prevent turning of the one pair of wheels as the other pair of wheels is turned exceeds a predetermined value.

In certain installations, it is necessary that the axis of pivotal connection of the output member 90 of the motion translating device be indicated, as to the controller of the operation of the vehicle, or the operation of the vehicle be prevented if the axis $x$ is not in the proper relation relative to the axes $y$ and $z$. To provide a position or control signal, a pair of micro-switches 271 and 272 may be secured to the body plate 93 by any suitable means, such as bolts 273 and spacers 274. The operator arms or levers 275 of the switches 271 and 272 are engageable by the roller 121 and either close or open an indicator or control circuit only when the clevis 115 is in either of its extreme positions relative to the body wherein it is held rigid due to engagement of its rollers 121 and 122 either with the pairs of cam bars 98 and 104, respectively, or the pairs of cam bars 97 and 103 respectively.

It will be apparent that the operative conditions of the motion translating devices T and Ta must be ascertained before motive power is applied thereto so that each pair of wheels will turn as required to prevent damage when its associated follower bar 71 and 71a, respectively, is moved transversely relative to the vehicle frame as due to the engagement of the wheels of their follower bar wheel assemblies with a side wall of a roadway or the turning of an end of the frame relative to the wheels at that end.

If the vehicle is moving to the left as seen in FIG. 1, the output members 91 and 91a of the motion translating devices T and Ta must be in the positions illustrated in full lines. If the vehicle is to move to the right, the output members 91 and 91a must be moved to the positions illustrated in broken lines in FIG. 1.

During movement of the vehicle over a roadway 60, the linkage 250 will, of course, exert a force resisting turning movement of the wheels of the rear pair of wheels 41a and 42a relative to the roadway about the vertical axes of their king pins as the front wheels 41 and 42 turn in a counterclockwise manner about the vertical axes of their king pins since the rear wheels are still travelling over a straight portion of the roadway. Such turning movement of the rear wheels will also be resisted by the engagement of the wheel assembly 83a with the side wall 62 of the roadway. The overload devic 256 will yield when the force applied to the linkage 250, compression or tension, at the overload device, exceeds a predetermined limit and permit the lever 257 to remain substantially motionless as its rod 280 is allowed to retract into or extend from its housing 281.

If the vehicle is to be towed by a force applied to the tow shaft 55 over an open road, so that the turning movements of the vehicle are controlled by the turning moveemnt imparted to the lever arms 54 or 54a to which the tow bar of the towing vehicle is rigidly secured, the operative conditions of the two motion translating devices is of no movement since the linkage 250 will, as was explained above, cause the rear wheels to turn in directions reverse to those of the front wheels relative to the vehicle as the front wheels are turned by the towing vehicle. The overload device again will protect the steering mechanism from damage as, for example, if the rear wheels are in ruts and cannot turn.

The generally parallelogram configuration provided by the convergent-divergent plan configuration of the cam bar sets 98, 104 and 97, 103 provides the additional, important advantage that the translating device T provides a mid position of the inner end portion 111 of the output member 90 wherein a degree of moveemnt of the body 92 about the pivotal axis of pivot shaft 206 is permitted without effecting any axial movement of output member 90. Conversely, in the mid position the output member 90 is free to move axially within device T for a limited degree without effecting pivotal movement of body 92, because of the provision of the mounting assembly 133 with its ball section member 137 which permits the input member 91, including tubular member 130, to pivot about the center of ball member 137 (clockwise and counter-clockwise as viewed in FIG. 4); this pivotal movement thus permits the output rod 90 to translate, axially, with respect to the body 92 and within the cam bars 98, 104, 97, 103 without moving body 92.

This advantageous feature permits a greater variety of applications for the translating device T. For example, an important advantage in the present embodiment is that when it is desired to tow the vehicle, it is possible to disconnect the follower bar 71 from the output member 90 for permitting turning movement of the wheels, connected to the output member 90, without movement of the follower bar 71, connected to the body 92. This is advantageous when it is desired not to move the follower bars 71, 71a during towing of the vehicle off the guideway. In the vehicle of the present example, the follower bars 71, 71a are restricted in transverse movement because of other design considerations. Moreover, it is not desirable that the follower bars 71, 71a project excessively outwardly from the vehicle during off-guideway operation because they may be exposed to damage by collision with adjacent structures.

It will now be seen that a new and improved steering means for towed or self propelled vehicles has been illustrated and described with permits the vehicle to move in either longitudinal direction with the turning movements of the pairs of front and rear wheels being controlled by separate steering mechanisms each including a motion translating device interposed between the king pins of its associated pair of wheels and a steering or control member, such as the follower bars, for selectively reversing the direction of towing movement of the wheels in relation to given movement of the control member relative to the vehicle.

It will also be seen that a new and improved motion translating device has been illustrated and described which is of simple structure having a body pivotally securable to a fixed structure, an input member pivotally secured to the body at a fixed location, and an output member which is secured to the body by means which permit its axis of pivotal connection to the body to be adjusted to permit the output member to be moved either in the same or opposite direction as the input member by the body as the body is pivotally moved by a force applied to the body.

While only one embodiment of the invention, together with several modifications thereof, has been described in detail herein and shown in the accompanying drawing, it will be evident that various further modifications are possible in the arrangement and construction of its components without departing from the scope of the invention.

What is claimed is:

1. A vehicle steering mechanism for a pair of transversely aligned vehicle supporting wheels turnable about substantially vertical axes and connected by a transversely extending axle, said mechanism including:
   a steering control member mounted on said vehicle for movement relative thereto;
   a linkage connecting said control member to said wheels for causing said wheels to turn about said vertical axes upon relative movement between said control member and the vehicle,
   said linkage including a motion translating device having a body mounted on the axle for pivotal movement about a first axis,
   an input member connected to said control member and movable therewith,
   said input member being connected to said body for pivotal movement about a second axis;
   an output member pivotal about a third axis relative to said body and connected to said wheels; and
   adjustable connecting means connecting said output member to said body for selectively varying the position of said output member relative to said body to cause said third axis to be positionable between said first and second axes wherein said output member is in a first position relative to said body and to cause said first axis to be located between said second and third axes wherein said output member is in a second position relative to said body whereby said output member is moved in the same direction as the input member when the output member is in said first position and in a direction opposite the direction of movement of said input member when the output member is in said second position to cause the wheels to turn in one direction upon a movement of the control member in a given direction when the output member is in said first position and to turn in a direction opposite said one direction when the output member is in said second position.

2. The mechanism of claim 1, wherein said control member is movable transversely relative to said vehicle,
   said wheels being mounted on substantially vertical king pins and at least one of said pins has a steering arm extending perpendicularly therefrom,
   said output member being connected to said steering arm.

3. The mechanism of claim 2, wherein said connecting means comprises an elongated member adjustably mounted on said body and having one end positionable in one position between said first and second axes and another position wherein said first axis is between said second and third axes, said output member having one end pivotally connected to said one end of said elongate member.

4. The mechanism of claim 3, wherein said motion translating device includes lock means for locking said elongate member against movement relative to said body.

5. The mechanism of claim 4, wherein said motion translating device includes a pair of spaced electric switch means one of which is operated by said connecting means when said elongate member is in said one position and the other of which is operated by said connecting means when said elongate member is in said another position.

* * * * *